United States Patent

[11] 3,534,717

| [72] | Inventor | Walter Froede<br>Neckarsulm, Germany |
|---|---|---|
| [21] | Appl. No. | 799,600 |
| [22] | Filed | Feb. 17, 1969 |
| [45] | Patented | Oct. 20, 1970 |
| [73] | Assignees | NSU Motorenwerke Aktiengesellschaft<br>Neckarsulm, Wuerttemberg, and<br>Wankel GmbH Lindau<br>Bodensee, Germany |
| [32] | Priority | Feb. 27, 1968 |
| [33] | | Germany |
| [31] | | 1,601,828 |

[54] ROTARY PISTON ENGINE WITH SPARK AND EXHAUST TEMPERATURE CONTROL
5 Claims, 1 Drawing Fig.

[52] U.S. Cl. ..................................................... 123/8.05, 60/29, 123/148
[51] Int. Cl. ............................................. F02b 53/04, F02b 75/10
[50] Field of Search ........................... 123/8(GOK)(JJ)(XX) 148(DS); 60/29, 30(Inquiry Hart)

[56] References Cited
UNITED STATES PATENTS

| 3,229,674 | 1/1966 | Muller ........................ | 123/8(JJ)UX |
| 3,306,035 | 2/1967 | Morrell ...................... | 60/30 |
| 3,359,955 | 12/1967 | Turner ....................... | 123/8(JJ)UX |
| 3,410,255 | 11/1968 | Winkelmann et al. ........ | 60/29UX |

*Primary Examiner*—Allan D. Herrmann
*Attorney*—Kane, Dalsimer, Kane, Sullivan and Smith ABSTRACT: A rotary piston internal combustion engine of the trochoidal type is provided and includes a housing having a multilobed inner peripheral surface. A multilobed rotor is mounted for rotation within the housing. The housing also having associated therewith an intake port and an exhaust port together with at least two spark plugs in communication with the interior chamber. A thermally responsive device attached to the exhaust port and responsive to the temperature conditions therein assures the decontamination of the exhaust gases. At lower load and speed ranges of the engine, this thermally responsive device operates to switch off all of the spark plugs except one to maintain the desired temperature conditions of the exhaust gases for optimum exhaust gas decontamination under these conditions.

Patented Oct. 20, 1970
3,534,717
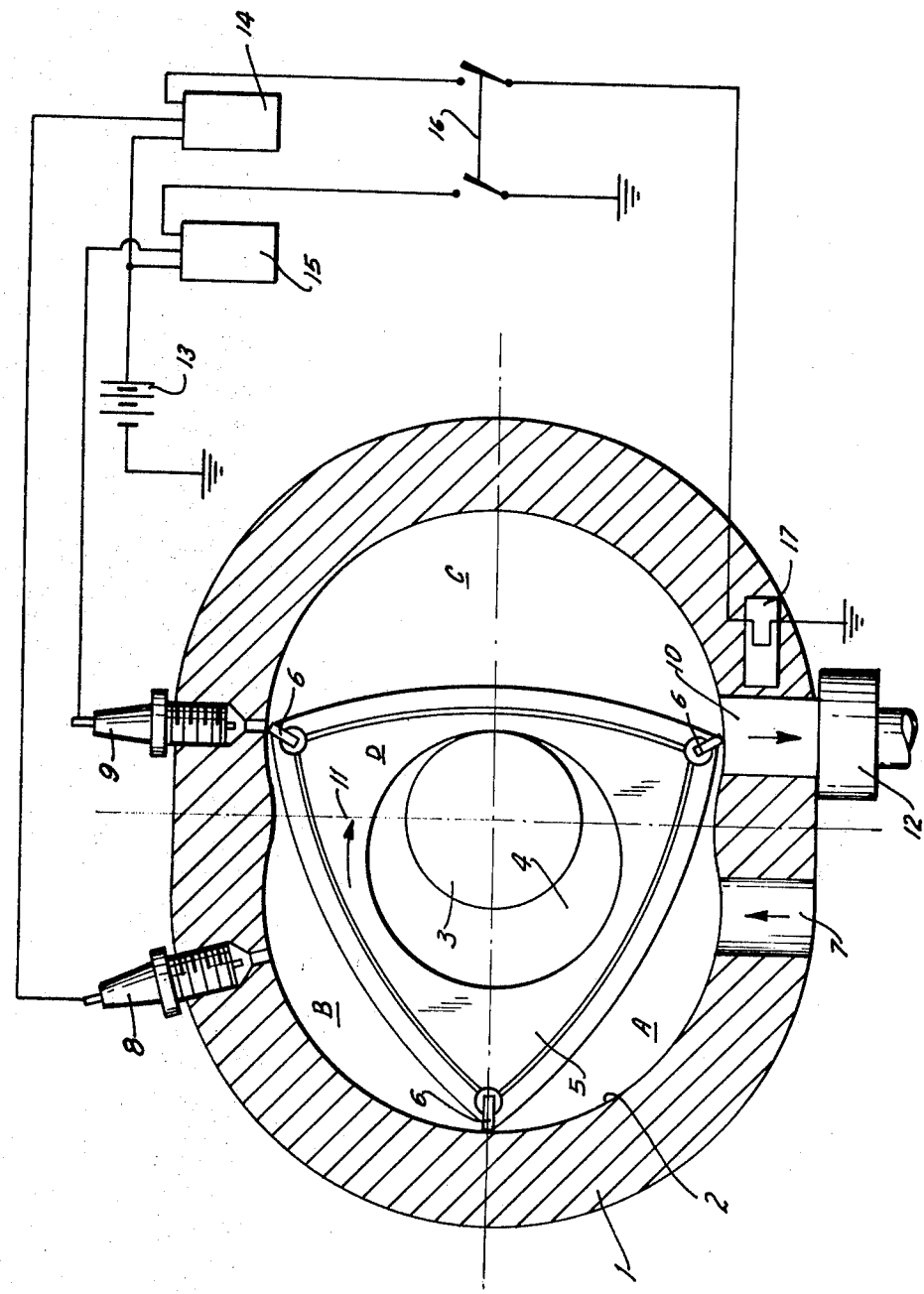
INVENTOR
WALTER FROEDE
BY
ATTORNEYS

ROTARY PISTON ENGINE WITH SPARK AND EXHAUST TEMPERATURE CONTROL

This invention relates to a rotary piston internal combustion engine of the trochoidal type comprising a plurality of spark plugs which are located in the housing and which are preferably arranged one behind the other in the direction of rotation of the piston or rotor.

In such rotary internal combustion engines, the provision of an exhaust gas catalyst or of a thermal reactor is an effective means for reducing the contents of hydrocarbons in the exhaust gases. However, such thermal reactors only work satisfactorily from a certain minimum temperature. This minimum temperature normally is not reached in the lower load and speed ranges with rotary internal combustion engines having multiple ignition. This means that in those ranges in which the decontamination of the exhaust gases is especially necessary, the thermal reactor is not fully effective.

It is the object of this invention to obtain a sufficient decontamination of the exhaust gases in the lower load and speed ranges as well by means of a catalyst or a thermal reactor connected to the exhaust of the engine.

According to the invention, means are provided for switching off all spark plugs except one in the lower load and speed range. With ignition by means of only one spark plug, the time of combustion of the charge is prolonged which leads to higher exhaust gas temperatures in the exhaust port whereby the thermal reactor can work satisfactorily also in these ranges of operation of the engine.

On the other hand, a multiple ignition is desirable for full load operation and especially for high speeds in order to obtain better thermal efficiency. In these ranges of operation, however, the exhaust gas temperature is sufficient also with multiple ignition to cause a response of the thermal reactor.

The spark plug which is not switched off during low load and low speed operation is preferably arranged in the inner peripheral surface of the housing behind the short axis of the trochoid, as seen in the direction of rotation of the rotor, in that region at which equal pressures exist in adjacent working chambers when the rotor lobe between said two chambers sweeps along this region. A spark plug arranged in said region ensures good cold starting characteristics of the engine.

The spark plugs can be switched on and off in dependence on the engine speed and/or in dependence on the position of the throttle valve of the carburator or directly in dependence on the exhaust gas temperature.

One embodiment of the invention is described in the following with reference to the accompanying drawing which shows a diagrammatic cross-sectional view of a rotary piston internal combustion engine according to the invention.

The rotary piston internal combustion engine comprises a housing having a peripheral wall 1 with an inner surface 2 in the form of a two-lobed epitrochoid. The housing further comprises end walls (not shown) within which a shaft 3 is rotatably supported, said shaft carrying an eccentric portion 4. A three-lobed piston or rotor 5 is mounted for rotation on the eccentric 4 and is provided at its apex zones with radially movable seal strips 6 which continuously sweep along the inner surface 2 as the rotor 5 rotates.

Thereby three variable volume working chambers A, B and C are formed. The peripheral wall 1 is provided with an intake port 7, two spark plugs 8 and 9 and an exhaust port 10. During each complete revolution of the rotor 5 each working chamber A, B and C undergoes a complete four-stroke operation which comprises the phases of intake, compression, expansion and exhaust. In the position of the rotor 5 shown in the drawing, chamber A is in its intake phase, chamber B is in its compression phase and chamber C is at the end of its expansion phase and is about to begin its exhaust phase.

A thermal reactor 12 of known design is connected to the exhaust port 10 for decontamination of the exhaust gases.

The two spark plugs 8 and 9 are arranged one behind the other, as viewed in the direction of rotation D of the rotor 5, the spark plug 8 being located in front of the short axis 11 of the two-lobed inner surface 2 and the second spark plug 9 being located a short distance behind said axis 11. The ignition circuit for the spark plugs 8 and 9 comprises the battery 13, the ignition coils 14 and 15 and the interruptor 16.

The two spark plugs 8 and 9 are fired simultaneously and ensure a fast burning of the charge and therewith a good thermal efficiency. However, in the lower load and speed ranges, such multiple ignition results in exhaust gas temperatures which are not sufficient for an effective operation of the thermal reactor 12. For this reason spark plug 8 can be switched off as it has been found that with only one spark plug higher exhaust gas temperatures are obtained which ensure a response of the thermal reactor 12 also in the lower load and speed ranges of the engine, that means at operation below one-fourth b.m.e.p. and below one-half maximum speed. The switching of the spark plug 8 is effected by means of a thermoswitch 17 which responds to the exhaust gas temperature in exhaust port 10 and which switches off the spark plug 8 if said temperature lies below the temperature which is necessary for proper operation of the thermal reactor 12. Spark plug 9 is arranged in that region of the inner surface 2 in which equal pressures exist in adjacent working chambers B and C when the radial seal 6 between these chambers sweeps over this region. This location is essential for good cold starting characteristics of the engine and, therefore, it is preferred to switch off not this spark plug 9 but the other spark plug 8.

This invention is not limited to the embodiment shown in the drawing. In other embodiments more than two spark plugs may be provided, and the spark plugs may also be arranged side-by-side or in one or both end walls of the housing. Furthermore, the spark plug 8 can be switched on and off also in dependence on the engine speed, for instance, by means of a conventional centrifugal switch, or in dependence on the position of the throttle valve of the carburetor and/or in dependence on the vacuum in the intake manifold of the engine.

I claim:

1. A rotary piston internal combustion engine of the trochoidal type comprising a housing having a multilobed inner peripheral surface; a multilobed rotor mounted for rotation within said housing; said housing comprising an intake port, an exhaust port and at least two spark plugs; a thermal reactor device attached to said exhaust port for decontaminating the exhaust gases, and means for switching off all spark plugs but one in the lower load and speed ranges of the engine to control the temperature of the exhaust gases passing through said reactor.

2. A rotary piston internal combustion engine according to claim 1 wherein the spark plugs are arranged one behind the other in the direction of rotation of the rotor.

3. A rotary piston internal combustion engine according to claim 2 wherein the spark plug which is not switched off is arranged behind the short axis of the inner peripheral surface, as seen in the direction of rotation of the rotor, in that region where equal pressures exist in adjacent working chambers when the lobe of the rotor between said working chambers passes over said region.

4. A rotary piston internal combustion engine according to claim 1 wherein said means for switching off said spark plugs is responsive to engine speed and/or to the position of the carburetor throttle valve.

5. A rotary piston internal combustion engine according to claim 1 wherein said means for switching off said spark plugs is responsive to the exhaust gas temperature.